United States Patent
Qi

(10) Patent No.: US 7,281,622 B2
(45) Date of Patent: Oct. 16, 2007

(54) CONVEYOR SYSTEM FOR HIGH SPEED, HIGH PERFORMANCE BAGGER

(75) Inventor: Weigang Qi, Westerville, OH (US)

(73) Assignee: Owens Corning Intellectual Capital, LLCDE (US)

( * ) Notice: Subject to any disclaimer, the term of this patent is extended or adjusted under 35 U.S.C. 154(b) by 53 days.

(21) Appl. No.: 11/364,221

(22) Filed: Feb. 28, 2006

(65) Prior Publication Data

US 2007/0199800 A1 Aug. 30, 2007

(51) Int. Cl.
B65G 15/14 (2006.01)

(52) U.S. Cl. .............................. 198/626.5; 198/626.1; 53/450; 28/117

(58) Field of Classification Search ............... 198/604, 198/606, 626.1, 626.3, 626.4, 626.5, 626.6; 53/439, 450, 477; 28/117, 121, 122
See application file for complete search history.

(56) References Cited

U.S. PATENT DOCUMENTS

| | | | |
|---|---|---|---|
| 2,467,291 A | 4/1949 | Brelsford et al. | |
| 3,660,964 A | 5/1972 | Willis et al. | |
| 3,805,489 A * | 4/1974 | Lieder et al. | 198/606 |
| 3,837,138 A | 9/1974 | Terry | |
| 3,991,538 A | 11/1976 | Finn et al. | |
| 4,287,983 A | 9/1981 | Bronsveld | |
| 4,591,043 A | 5/1986 | Muller | |
| 4,676,361 A | 6/1987 | Heisler | |
| 4,750,728 A * | 6/1988 | Keller | 198/626.1 |
| 4,902,184 A * | 2/1990 | Fritz | 198/626.1 |
| 5,341,915 A | 8/1994 | Cordia et al. | |
| 5,511,651 A | 4/1996 | Barth | |
| 5,635,235 A * | 6/1997 | Sanchez et al. | 198/604 |
| 5,660,262 A | 8/1997 | Landrum et al. | |
| 5,755,851 A | 5/1998 | Scott et al. | |
| 5,875,697 A * | 3/1999 | Cole et al. | 198/626.4 |
| 5,975,282 A | 11/1999 | Shaver et al. | |
| 6,298,529 B1 * | 10/2001 | Aube et al. | 28/117 |
| 6,390,766 B1 | 5/2002 | Craig et al. | |
| 7,156,222 B2 * | 1/2007 | Schnuelle et al. | 198/626.3 |

FOREIGN PATENT DOCUMENTS

JP 54118086 9/1979

* cited by examiner

*Primary Examiner*—James R. Bidwell
(74) *Attorney, Agent, or Firm*—Inger H. Eckert; Maria C. Gasaway

(57) ABSTRACT

A conveyor assembly is configured to convey and maintain compression of multiple compressible batts. Adjacent pairs of conveyor systems within the conveyor assembly define a space between the pair of conveyor systems for receiving and conveying compressible batts. Each pair of adjacent conveyor systems has at least two upper belts in a coplanar relationship. One of the two upper belts travels in an advancing direction and other upper belt travels in a returning direction. Each pair of adjacent conveyor systems also has at least two lower belts in a coplanar relationship. One of the lower belts travels in the advancing direction and the other lower belt travels in the returning direction.

27 Claims, 26 Drawing Sheets

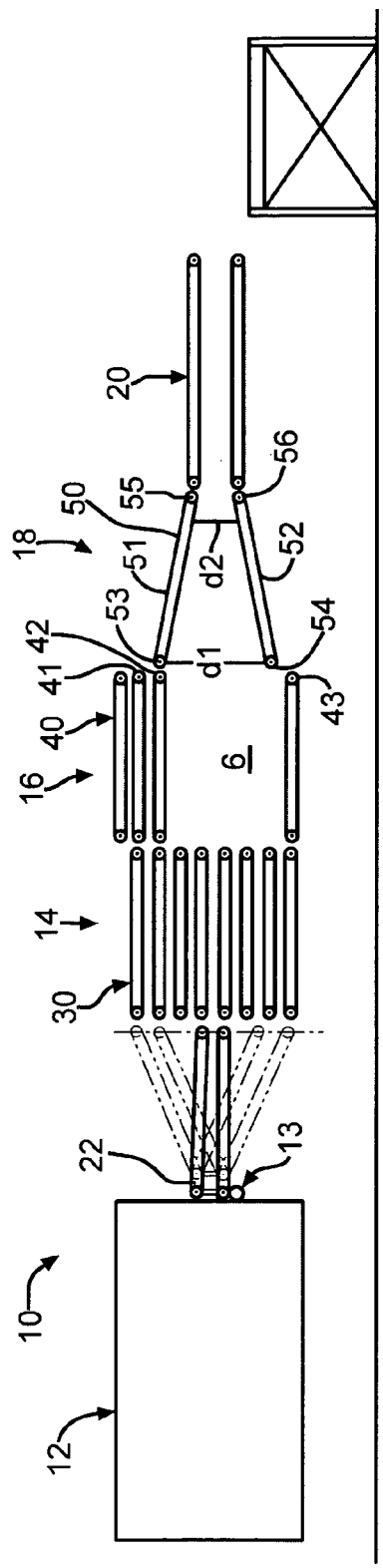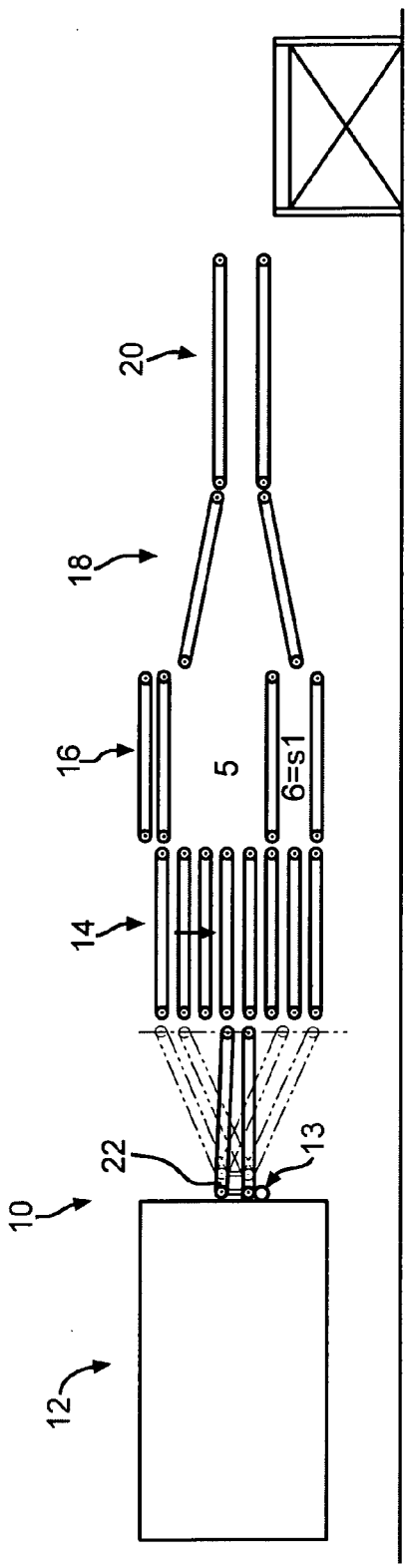

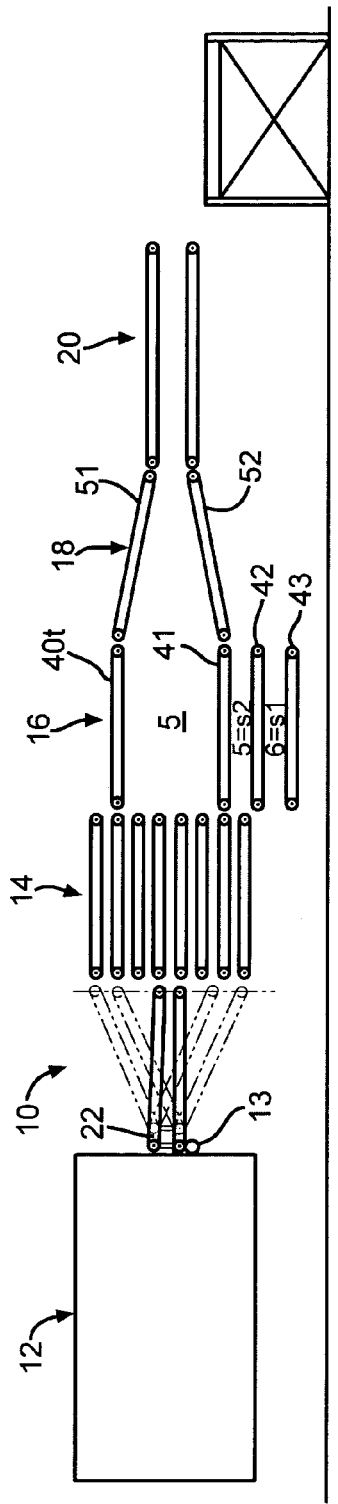
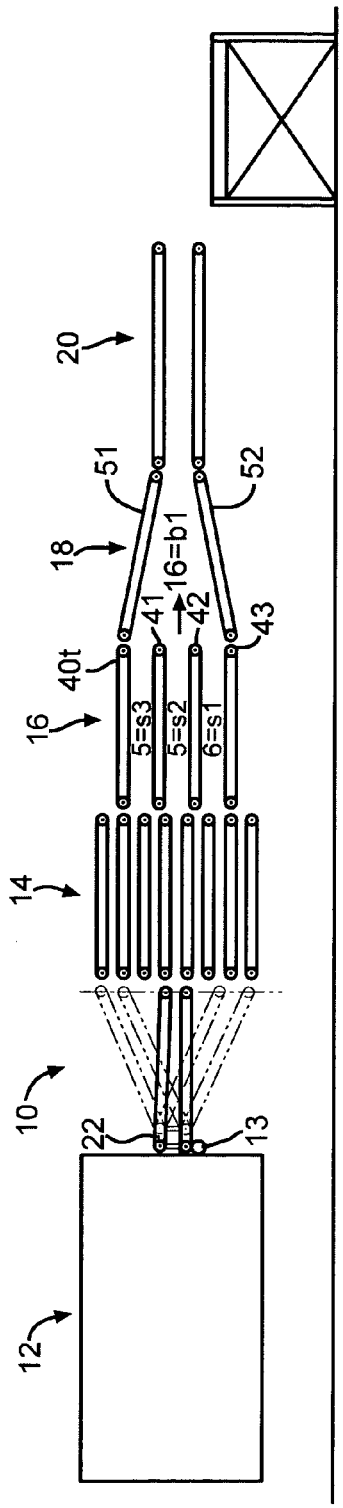
FIG. 3
FIG. 4

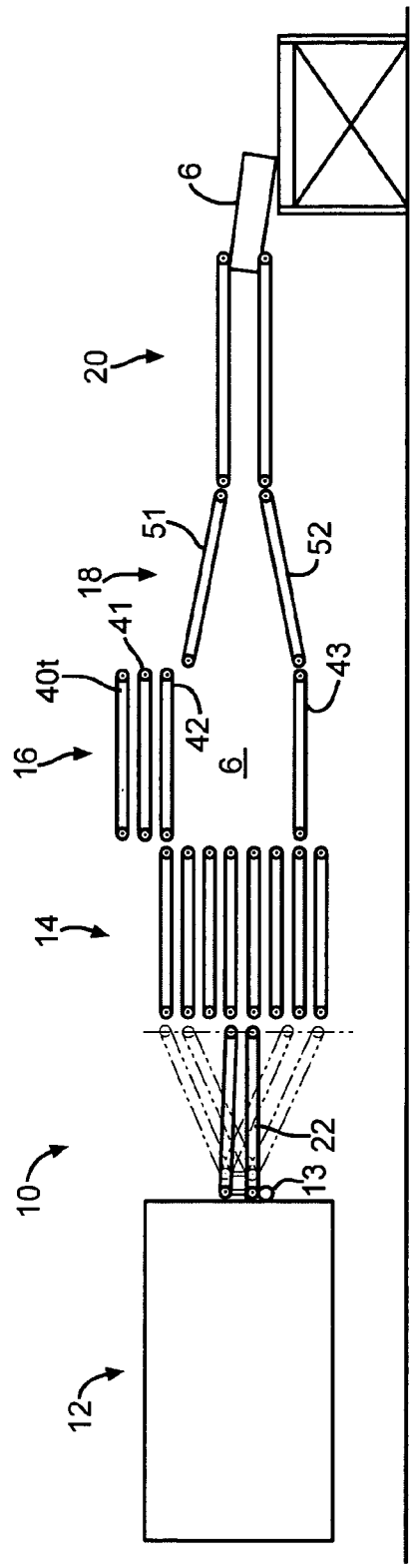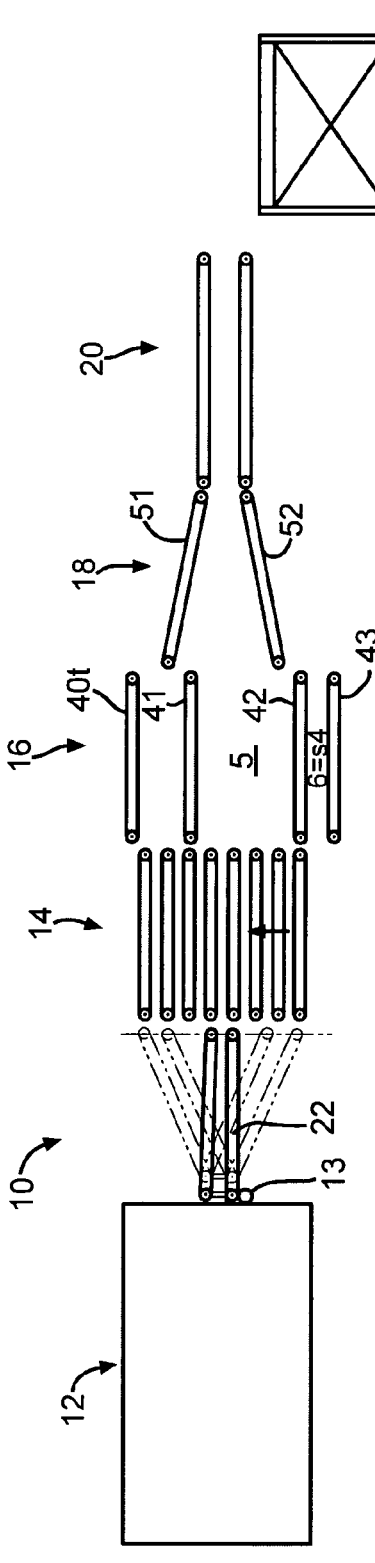

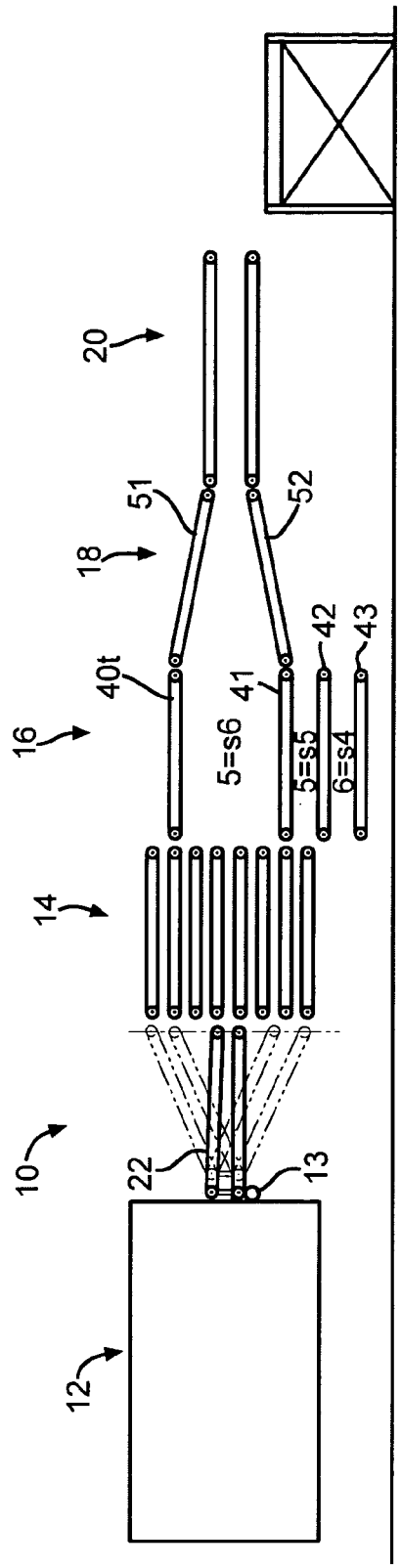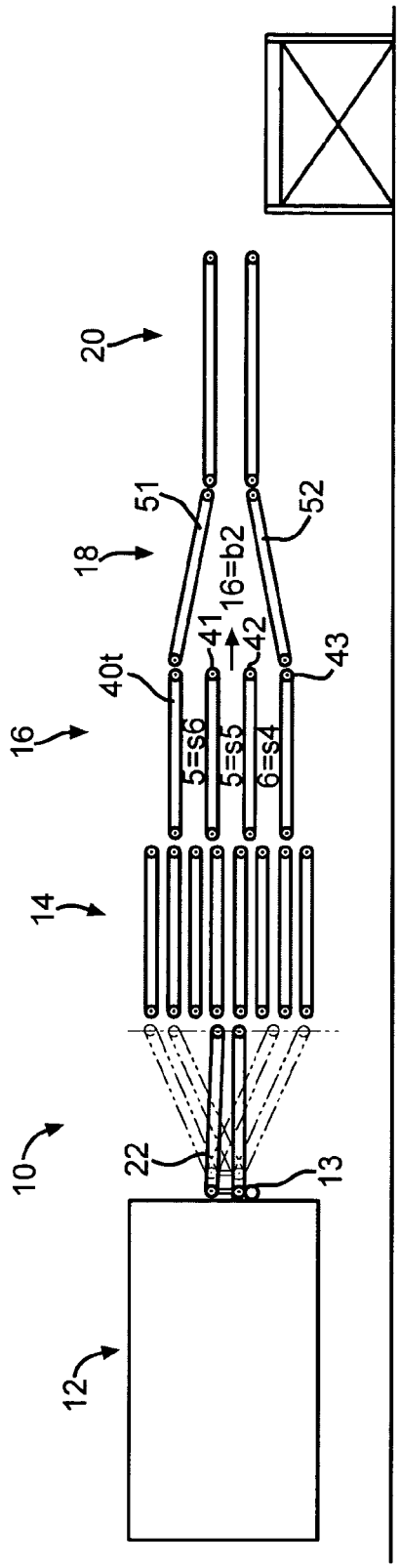
FIG. 7
FIG. 8

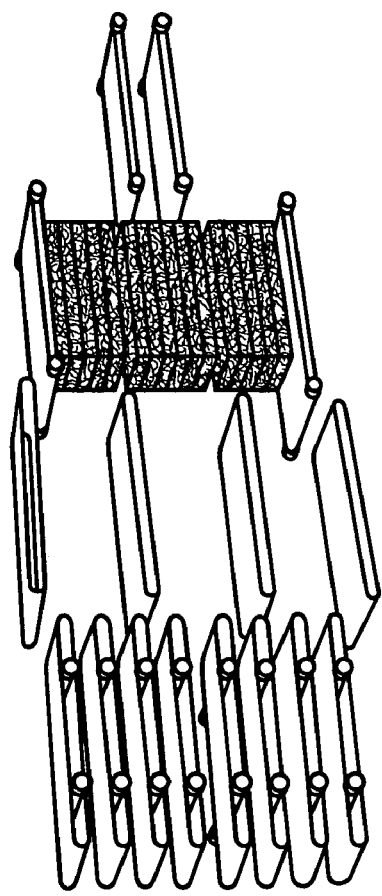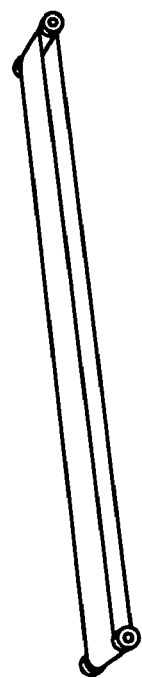
FIG. 29

CONVEYOR SYSTEM FOR HIGH SPEED, HIGH PERFORMANCE BAGGER

TECHNICAL FIELD AND INDUSTRIAL APPLICABILITY OF THE INVENTION

The present invention relates to an apparatus and method for compressing and packaging compressible batts, and is useful, in particular, for the compression packaging of batts of insulating material. The batts, once at least partially compressed, remain under compression without being allowed to expand during the compressing and packaging.

BACKGROUND OF THE INVENTION

Fibrous insulation material is typically manufactured in common lengths and widths, called insulation batts, to accommodate typical building frame structure dimensions. Fibrous insulation batts are commonly made of mineral fibers, such as glass fibers, and usually have a density within the range of from about 0.2 to about 1.0 pounds per cubic foot (3.2 to 16 kg/m$^3$). Typical batt sizes are 16 or 24 inches (40.6 cm or 61.0 cm) wide by 8 to 10 feet (2.44 m) long. These batts can be packaged in various ways. The batts can be staggered and rolled together along their lengths so that a roll would contain about 10 batts.

Alternatively, in order to reduce storage and transportation costs, it is common practice to package insulation batts by compressing them and then providing them with a covering, for example, a bag, which maintains the batts in their compressed state. When the bag is subsequently removed at the point of utilization of the batts, the batts expand to their normal size.

In the past, the compression of the insulation batts has been achieved by stacking the batts in a compression chamber which has a fork for compressing the batts and a piston for discharging the compressed batts from the compression chamber into a bagging apparatus. The compressed batts are typically forced into the bag.

The insulation batts are delivered to the compression machine by an endless conveyor from a production line. To avoid interruption of the operation of the production line or an accumulation of uncompressed insulation batts, it is necessary to ensure that the insulation batts are promptly handled by the compression machine.

Normally, the insulation batts are manually collected from the conveyor belt into batches. Each batch comprises a stack of the batts, which are then manually loaded into the compression chamber. This collection process requires a considerable amount of manual handling of the insulation batts, which is uneconomical. At times, the batts expand during this packaging process, which causes further delays and sometimes damage to the batts.

Also, the compression machine itself sometimes causes damage to the batts. For example, top and bottom batts are damaged due to the shear motion between the adjacent batts and/or the batts' contact with the doors and snouts on the compression machine.

In other instances, the batts can be subjected to facing flange damage due to mechanical finger movements of the compression machine.

Another concern with currently available compression machines is that there is a loss of efficiency in the packaging process since the compression machines often must use a mechanical retracting motion which takes critical time in the overall packaging process.

It is, accordingly, an object of the present invention to provide a novel and improved apparatus for compressing and packaging compressible batts which, while entirely eliminating manual handling of the compressible batts, enables a larger number of the compressible batts to be included in one package.

The invention will be more readily understood from the following description of a preferred embodiment thereof given, by way of example, with reference to the accompanying drawings.

BRIEF DESCRIPTION OF THE DRAWINGS

FIG. 1 is a schematic, side elevational, illustration of one embodiment of an apparatus for compressing and packaging compressible batts, showing a first position of the apparatus for compressing and packaging compressible batts.

FIG. 2 is a schematic, side elevational, illustration showing a second position of the apparatus of FIG. 1.

FIG. 3 is a schematic, side elevational, illustration showing a third position of the apparatus of FIG. 1.

FIG. 4 is a schematic, side elevational, illustration showing a fourth position of the apparatus of FIG. 1.

FIG. 5 is a schematic, side elevational, illustration showing a fifth position of the apparatus of FIG. 1.

FIG. 6 is a schematic, side elevational, illustration showing a sixth position of the apparatus of FIG. 1.

FIG. 7 is a schematic, side elevational, illustration showing a seventh position of the apparatus of FIG. 1.

FIG. 8 is a schematic, side elevational, illustration showing an eighth position of the apparatus of FIG. 1.

FIGS. 11-30 are diagrammatic illustrations of another embodiment of an apparatus for compressing and packaging compressible batts, where the apparatus is shown in various positions, or stages, of a compressing/packaging cycle that the apparatus passes through while performing a method for compressing and packaging compressible batts.

SUMMARY OF INVENTION

Figure 9:
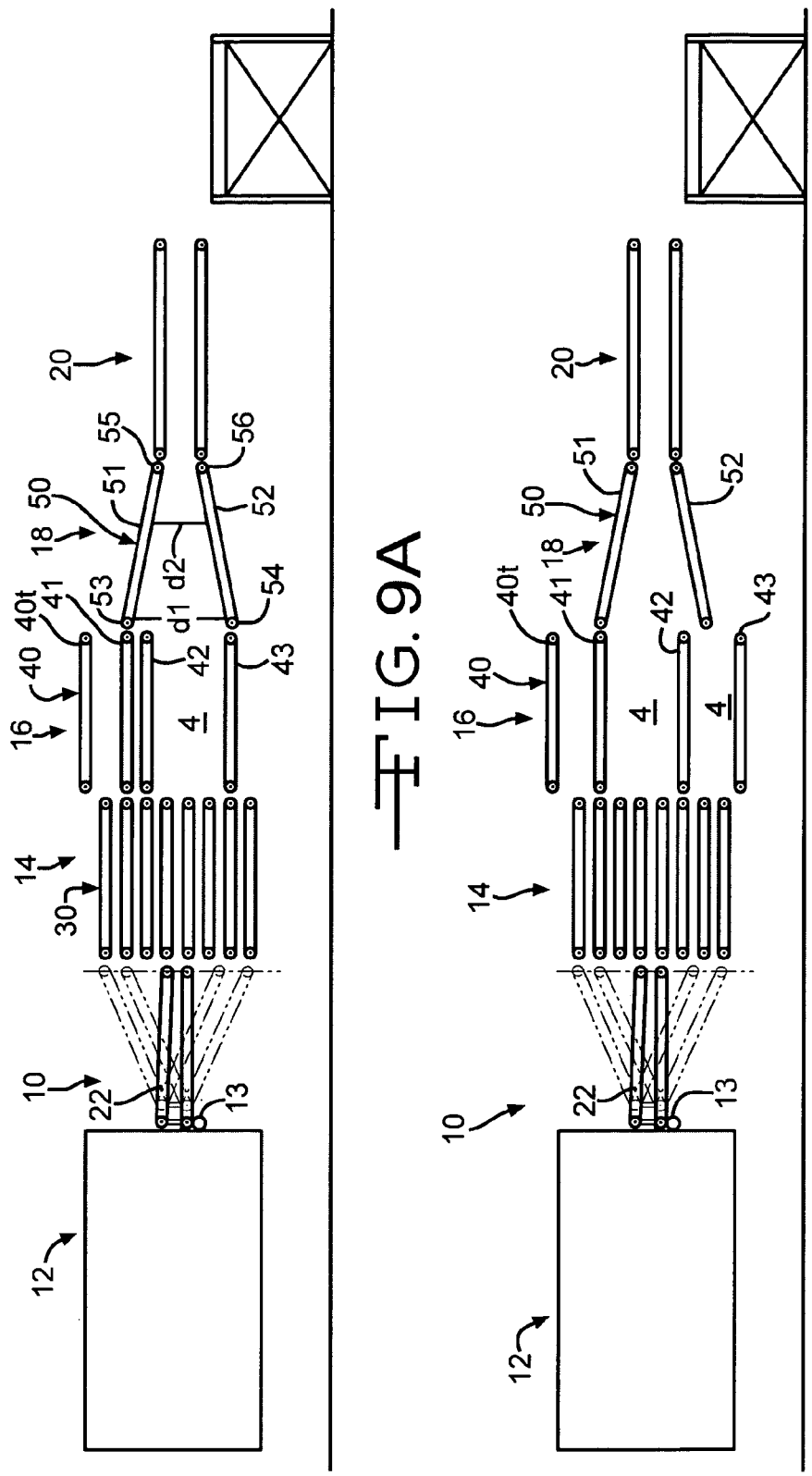
FIG. 9A is a schematic, side elevational, illustration of another embodiment of an apparatus for compressing and packaging compressible batts, showing a first position of the apparatus for compressing and packaging compressible batts.
FIG. 9B is a schematic, side elevational, illustration showing a second position of the apparatus of FIG. 9A.

According to the present invention, there is provided an apparatus and a method for compressing and packaging compressible batts. The batts, once at least partially compressed, remain under compression without being allowed to expand during the compressing and packaging.

In one aspect the conveyor assembly includes a vertical stack of at least two conveyor systems. Adjacent pairs of conveyor systems within the conveyor assembly define a space between the pair of conveyor systems for receiving and conveying compressible batts. A pair of adjacent conveyor systems has: i) at least two upper belts in a coplanar relationship and positioned above and facing the space between the pair of conveyor systems, with one of the two upper belts positioned above the space mounted for traveling in an advancing direction relative to the conveyor assembly and the other of the two upper belts positioned above the space mounted for traveling in a returning direction; and, ii) and at least two lower belts in a coplanar relationship and positioned below and facing the space between the pair of conveyor systems, with one of the two lower belts positioned below the space mounted for traveling in the advancing direction relative to the conveyor assembly and the other of the two lower belts positioned below the space mounted for traveling in the returning direction.

In certain embodiments, the assembly has shields associated with each of the belts traveling the returning direction. The shields are positioned to prevent contact between the belts and a compressible batt contained between the conveyor systems.

In certain embodiments, the upper advancing belt and the lower returning belt are in a vertically aligned relationship, and the lower advancing belt and the upper returning belt are in a vertically aligned relationship.

In yet another aspect, the present invention relates to a method for conveying compressible batts and for maintaining compression of multiple compressible batts by conveying multiple compressible batts using a conveyor assembly having a pair of adjacent conveyor systems.

In certain embodiments, the method includes sequentially receiving individual batts in each space between the pair of conveyor systems; holding each individual batt in each space until a determined number of batts are held in the conveyor assembly; and, transferring the held batts as a stack of batts from the conveyor assembly.

Various objects and advantages of this invention will become apparent to those skilled in the art from the following detailed description of the preferred embodiments, when read in light of the accompanying drawings.

DESCRIPTION OF THE INVENTION

The present invention provides an apparatus and a method for compressing and packaging compressible batts. The apparatus maintains the batts, once at least partially compressed, substantially under compression without being allowed to expand during the stacking, compressing and packaging.

In certain embodiments, the individual batts are kept separated while being compressed. This separation while the batts are being compressed makes it easier to maintain compression on each batt.

Also, in certain embodiments, the individual batts are gathered into stacks, and these stacks are kept separated while being further compressed. This separation while the stacks of batts are being further compressed also makes it easier to maintain compression on each batt.

Referring now to the Figures, FIGS. 1-8 are schematic, side elevational, illustrations of one embodiment of an apparatus 10 for compressing and packaging compressible batts, such as batts of fiberglass materials. The batts, once at least partially compressed, remain under compression substantially without being allowed to expand during the compressing and packaging.

In certain embodiments, the apparatus 10 for compressing and packaging compressible batts can include a folding device (not shown) that generally folds the compressible batts. Such folding devices are well-known in the industry. The apparatus 10 generally includes a delivery assembly 12 for delivering a supply of successive compressible batts a1, a2, etc. to a stacking assembly 14. The stacking assembly 14 sequentially compiles multiple compressible batts into a stack s1 and simultaneously delivers the stack of compressible batts to a pre-compressing assembly 16. The pre-compressing assembly 16 receives multiple stacks of compressible batts and "pre-compresses" the multiple stacks to a first stage of compression. The pre-compressing means 16 delivers the pre-compressed multiple stacks to a compressing assembly 18. The compressing assembly 18 compresses the multiple, pre-compressed stacks into a batch b1 and delivers the compressed batch b1 to a packaging assembly 20 for packaging the compressed batches. In certain embodiments, the packaging assembly 20, for example, applies a suitable covering to the compressed batches.

In the embodiment shown in FIGS. 1-8, the delivery assembly 12 receives a plurality of compressible batts and delivers the compressible batts to a pivoting assembly 13. The pivoting assembly 13 pivotably moves a continuous distributive conveyor 22 into a position adjacent individual stacking conveyors of the stacking assembly 14, as described below.

The stacking assembly 14 includes a set 30 of stacking conveyors. In the embodiment shown, the set 30 of stacking conveyors includes eight stacking conveyors; it should be understood, however, that in certain embodiments, the stacking assembly 14 can contain fewer or more stacking conveyors. The stacking assembly 14 is incrementally movable with respect to the article delivery assembly 12 such that the stacking assembly 14 is adaptable for delivering multiple and separate compressible batts to individual conveyors of the pre-compressing assembly 16.

The pre-compressing assembly 16 includes a set 40 of pre-compressing conveyors. It is to be understood that in other embodiments, there can be a different number of pre-compressing conveyors, and that such embodiments are within the contemplated scope of the present invention. The pre-compressing assembly 16 is incrementally movable with respect to the stacking assembly 14 such that the pre-compressing assembly 16 is adaptable for delivering multiple and separate stacks of compressible batts to the compressing assembly 18.

The compressing assembly 18 includes a set 50 of compressing conveyors. In the embodiment shown, the compressing assembly 18 includes a top compressing conveyor 51 and a bottom compressing conveyor 52. The top compressing conveyor 51 and the bottom compressing conveyor 52 are positioned at an angle with respect to each other such that both the top compressing conveyor 51 and the bottom compressing conveyor 52 have leading edges 53 and 54, respectively, that are adjacent the pre-compressing assembly 16 and, further, have trailing edges 55 and 56, respectively, that are adjacent the packaging assembly 20. The leading edges 53 and 54 are spaced a first distance $d_1$ from each other that is greater than a second distance $d_2$ between the trailing edges 55 and 56. When stacks of compressible batts leave the pre-compressing assembly 16 and are delivered into the leading edges 53 and 54, the compressible batts are further compressed as the compressible batts are moved, or conveyed, toward the closer positioned trailing edges 55 and 56.

Referring now to FIGS. 1-8 in sequence, the numerals "5" and "6" generally depict the number of compressible batts present at the particular stage within pre-compressing assembly 16 as the compressible batts are being formed into stacks. The larger numerals "5 and/or 6" shown in FIGS. 1-3 and 5-7 depict such compressible batts at a stage in the process prior to being "pre-compressed". The smaller numerals "5 and/or 6" shown in FIGS. 2-4 and 6-8 depict such compressible batts at a stage in the process where such compressible batts are "pre-compressed". The even smaller numerals "16" shown in FIGS. 4 and 8 depict the number of compressible batts at a stage in the process where the compressible batts are "compressed" into a batch.

Figure 10:
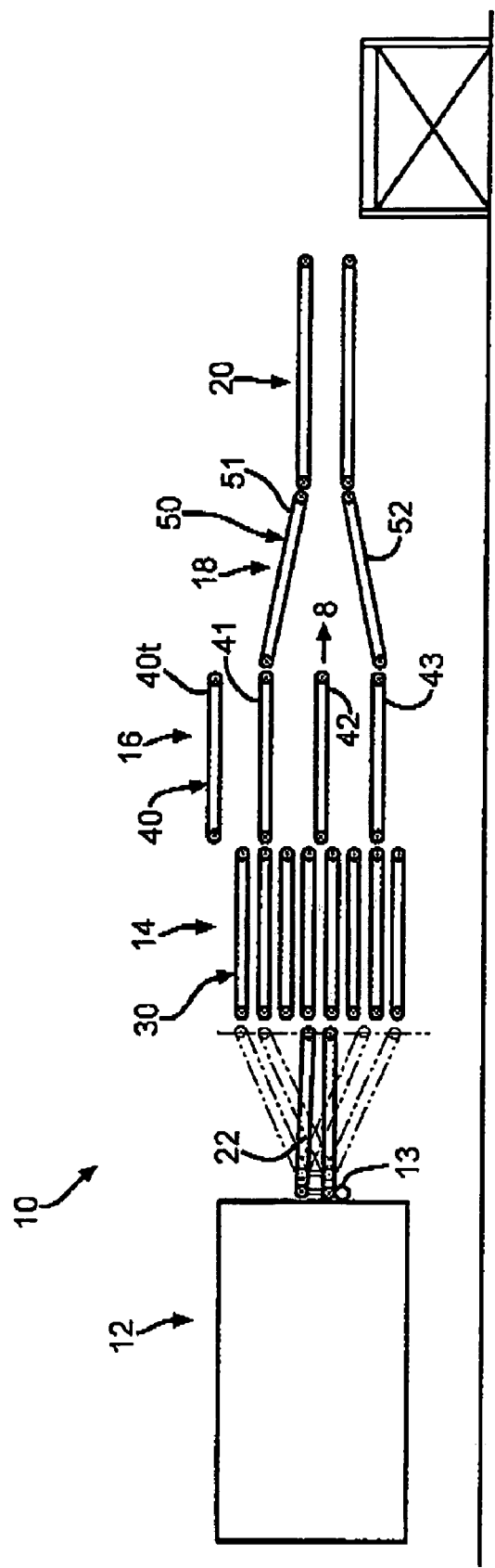
FIG. 10 is a schematic, side elevational, illustration showing a third position of the apparatus of FIG. 9A.

Referring now to FIGS. 9A, 9B and 10 in sequence, the numeral "4" generally depicts the number of compressible batts present at the particular stage within pre-compressing assembly 16 as the compressible batts are being formed into stacks. The larger numeral "4" shown in FIGS. 9A and 9B depicts such compressible batts at a stage in the process prior to being "pre-compressed". The smaller numeral "4" shown in FIG. 9B depicts such compressible batts at a stage in the process where such compressible batts are "pre-compressed. The small numeral "8" shown in FIG. 10 depicts the number of compressible batts at a stage in the process where the compressible batts are "compressed" into a batch.

Referring now to FIGS. 11 through 30 (along with the FIGS. 1-8 and FIGS. 9A, 9B and 10), depicted therein are diagrammatic illustrations of the multi-functional apparatus 10 for stacking, compressing and packaging compressible batts. In the embodiments shown in FIGS. 1-8 and in FIGS. 9-10, it is to be understood that the delivery assembly 12 includes the pivoting assembly 13 which delivers the compressible batts to the stacking assembly 14 where the stacking assembly 14 is stationery and does not move in a vertical direction. In the embodiment shown in FIGS. 11-30, the delivery assembly 12 delivers compressible batts to the stacking assembly 14 which is capable of movement in a vertical direction. Likewise, in the embodiments shown in FIGS. 1-8 and FIGS. 9-10, it is to be understood that the compressing assembly 18 includes the set 50 of top compressing conveyor 51 and bottom compressing conveyor 52 that are positioned at an angle with respect to each other, while in FIGS. 11-30, the set 50 of top and bottom compressing conveyors 51 and 52, respectively, are in a parallel relationship.

It is to be understood that all embodiments shown in FIGS. 1-30 are within the contemplated scope of the present invention, and that the following description of compressible batts moving through the apparatus 10 is equally applicable to all embodiments described herein. For ease of illustration, the numerals, as used in the Figures, are kept the same for all embodiments.

In the embodiment shown in the diagrammatic figures, the delivery assembly 12 includes the continuous distributive conveyor 22 for delivering a plurality of compressible batts, numbered as a1, a2, a3, etc. herein, to the stacking assembly 14.

In the embodiment shown, the stacking assembly 14 includes the set 30 multiple stacking conveyors. It is to be understood that in other embodiments, there can be a different number of stacking conveyors, and that such embodiments are within the contemplated scope of the present invention. In the embodiments shown in FIGS. 11-30, the set 30 of conveyors includes a top engaging stacking conveyor 30t, and a plurality of stacking conveyors, numbered herein as a first stacking conveyor 31 through a seventh stacking conveyor 37.

Figure 11:
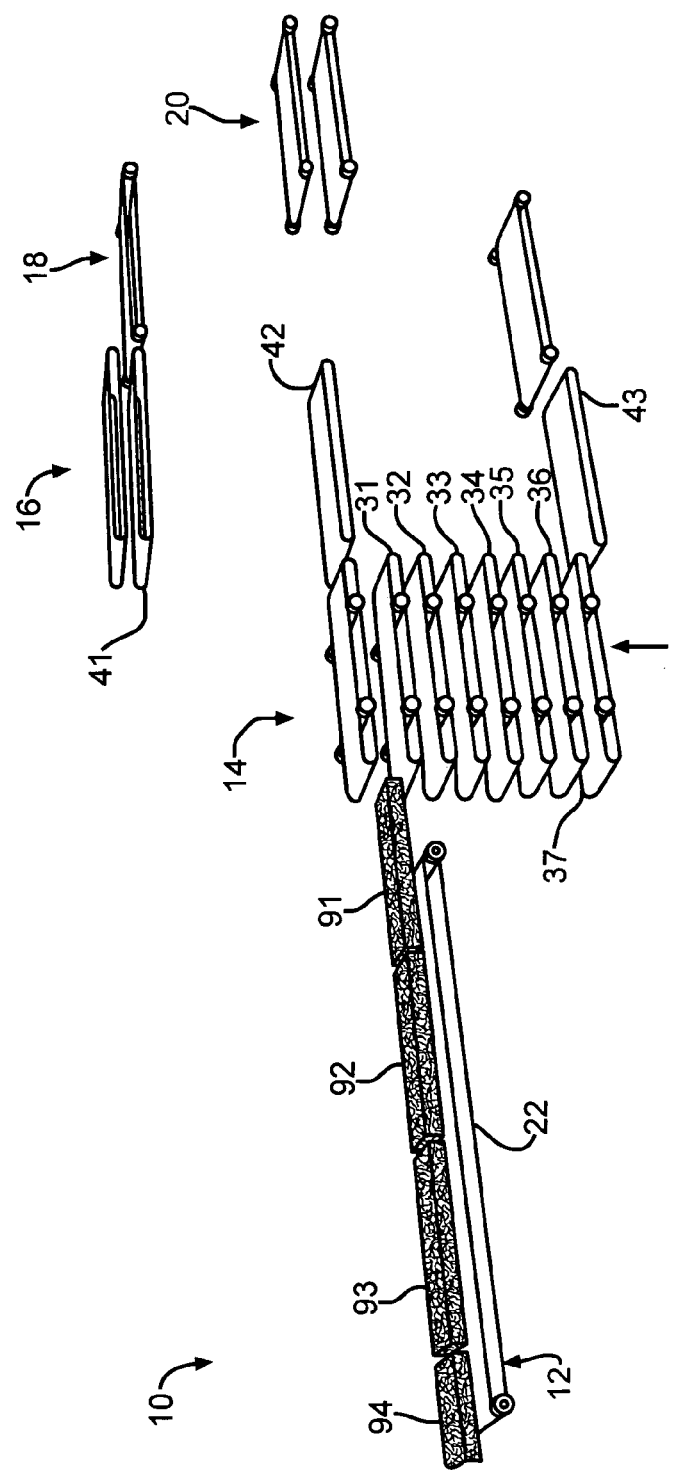
Figure 12:
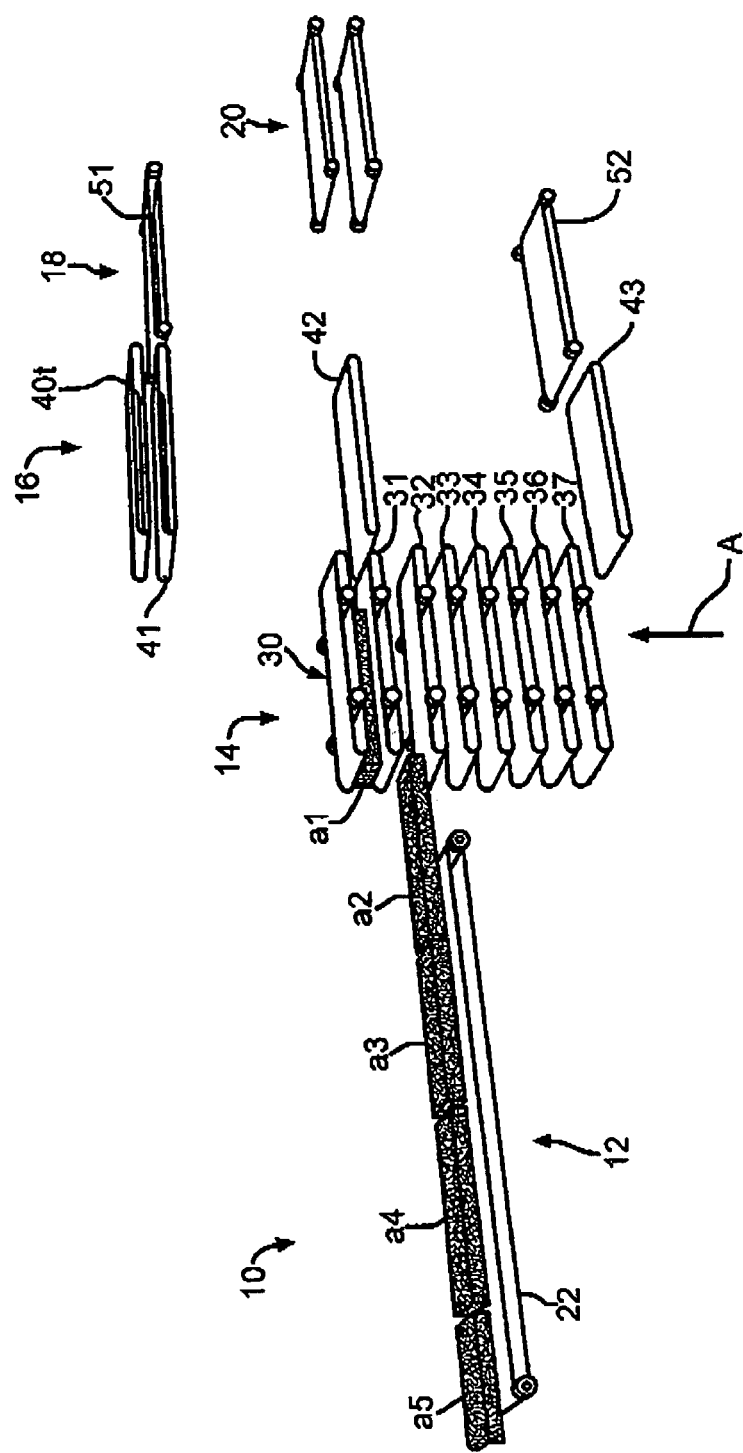
Figure 13:
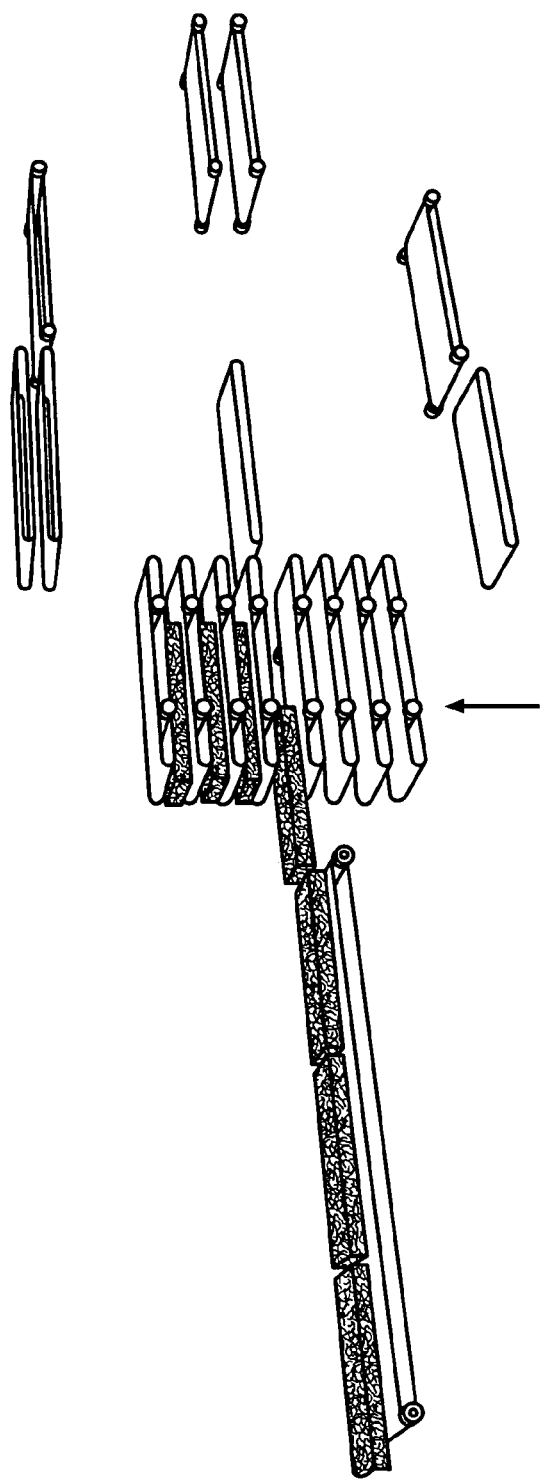
Figure 14:
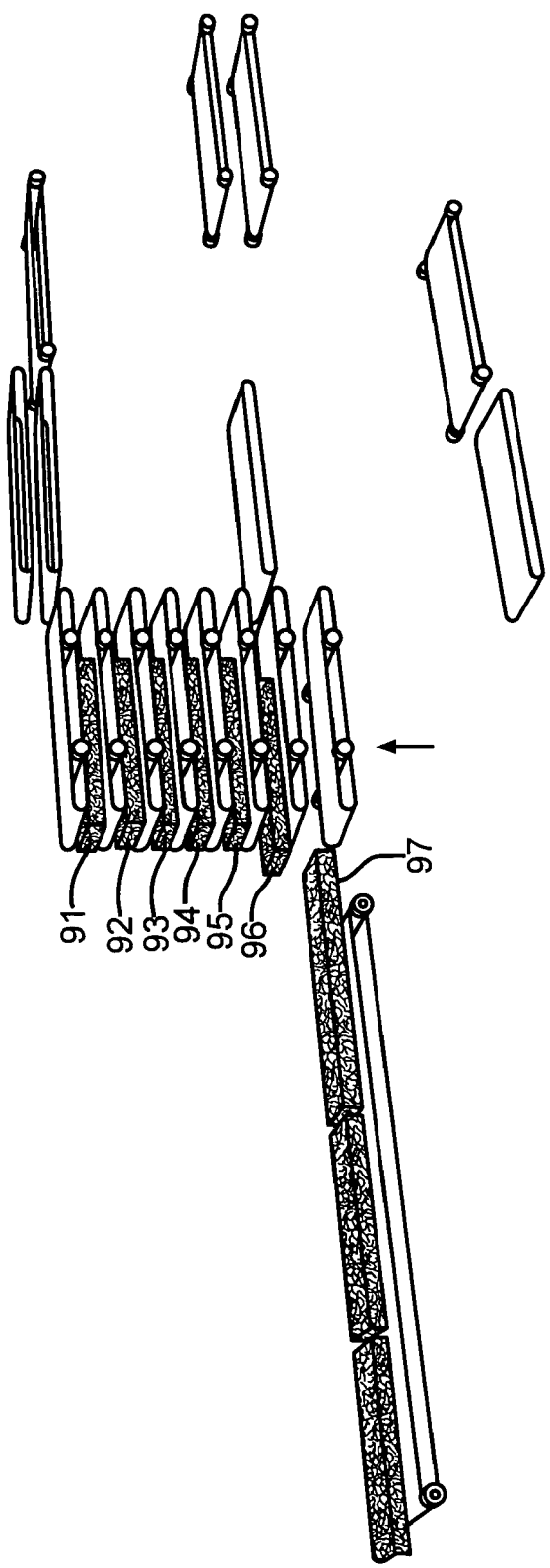

The first stacking conveyor 31 receives the first article a1 from the distributive conveyor 22, as shown in FIGS. 11-12. After the first stacking conveyor 31 receives the first article a1, the reciprocating stacking assembly 14 moves in an upward direction, as indicated by arrow A, such that the second stacking conveyor 32 is positioned adjacent the delivery conveyor 20 for receiving the second article a2. Similarly, after the second stacking conveyor 32 receives the second article a2, the reciprocating stacking assembly 14 moves in the upward direction such that the third stacking conveyor 33 is positioned adjacent the delivery conveyor 20 for receiving the third article a3, as shown in FIG. 13. The reciprocating stacking assembly 14 continues to move in the upward direction until the sixth stacking conveyor 36 receives the sixth article a6, as shown in FIG. 14.

Figure 15:
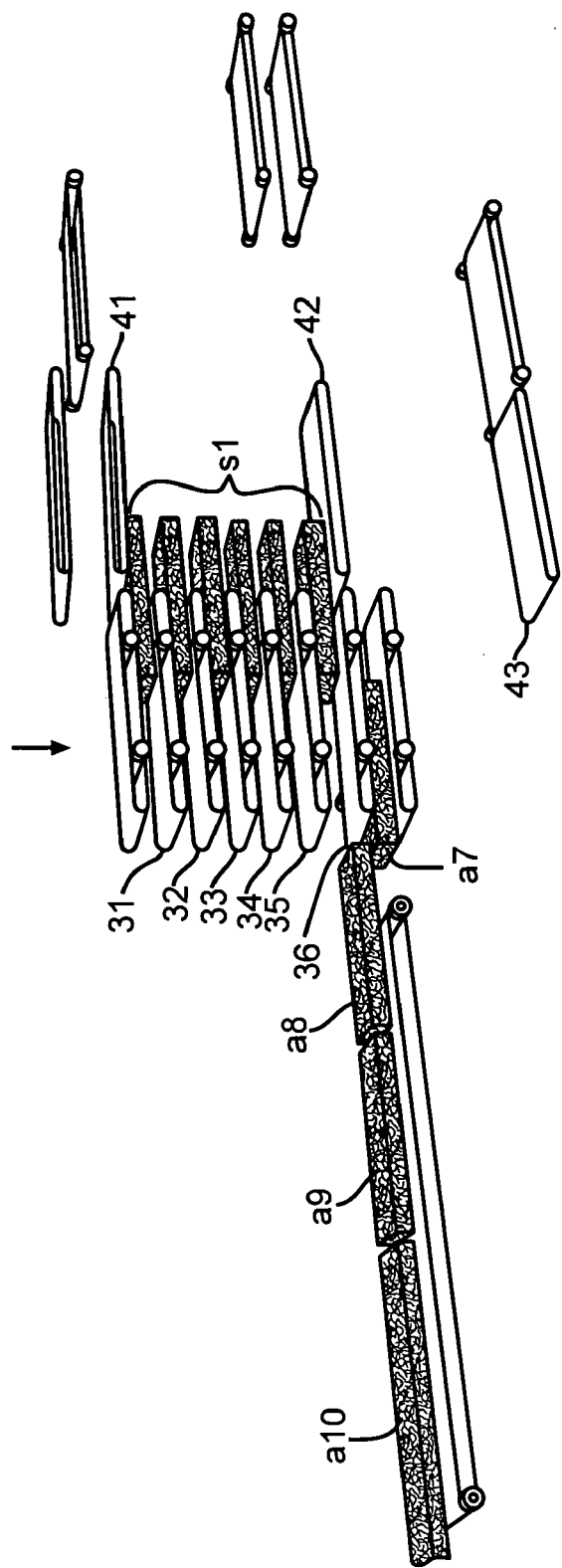
Figure 16:
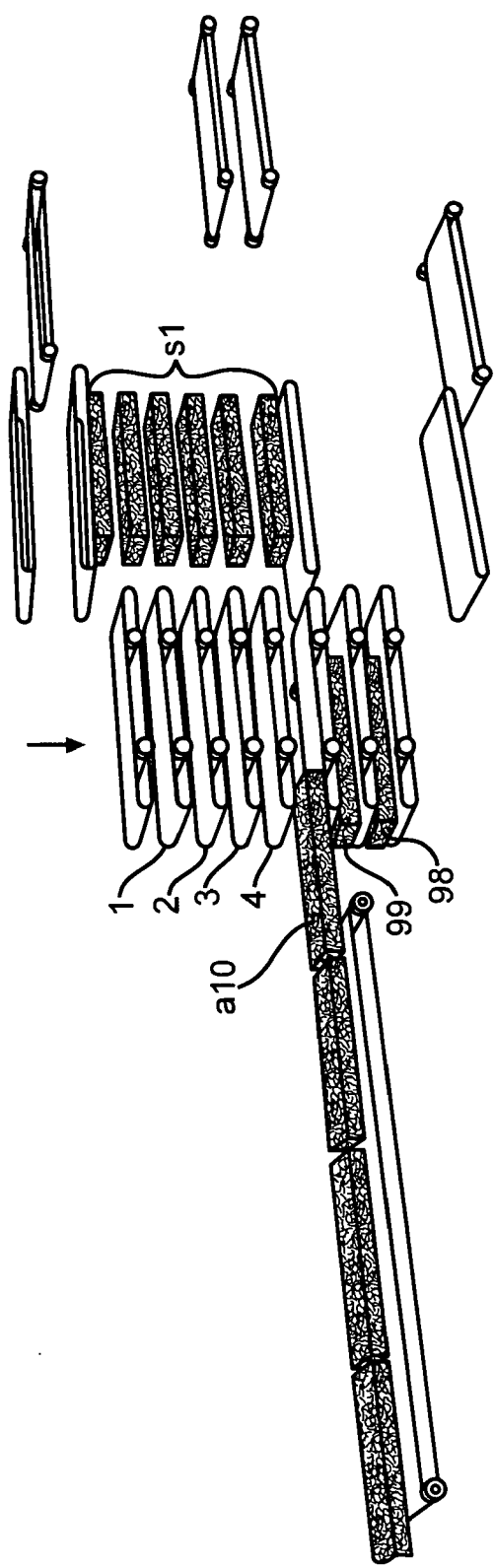

The first through sixth stacking conveyors 31-36 are operatively engaged, or activated, by the stacking assembly 14 such that the first through sixth compressible batts a1-a6 are conveyed to the pre-compressing assembly 16, as shown in FIG. 15.

The invention also contemplates that a bottom article, shown as seventh article a7, can be included in the stack s1 so that the set 30 of stacking conveyors is operated most efficiently. Further, the adjacent article of a subsequent stack can be delivered to the bottom conveyor 36 as the article already on the conveyor is being conveyed to the pre-compressing assembly 16.

The pre-compressing assembly 16 includes a set 40 of pre-compressing conveyors. It is to be understood that in other embodiments, there can be a different number of pre-compressing conveyors, and that such embodiments are within the contemplated scope of the present invention. In the embodiments shown in FIGS. 11-30 the set 40 of pre-compressing conveyors include a top engaging pre-compressing conveyor 40t, and a plurality of stacking conveyors, numbered herein as a first pre-compressing conveyor 41 through a third pre-compressing conveyor 43. It is to be understood that in other embodiments, there can be a different number of pre-compressing conveyors, and that such embodiments are within the contemplated scope of the present invention.

At this stage of the process, as shown in FIG. 15, the second pre-compressing conveyor 42 is in a planar relationship with the sixth stacking conveyor 36 and receives the compressible batts a1-a6, thereby forming a first stack s1.

Simultaneously, the delivery assembly 12 delivers a seventh article a7 to the seventh stacking conveyor 37, as shown in FIGS. 14 and 15. As the compressible batts a1-a6 are being delivered to second pre-compressing conveyor 42 and forming the stack s1, the stacking assembly 14 is receiving additional compressible batts. The stacking assembly 14 begins to move in a downward direction, as indicated by arrow B, such that the delivery assembly 12 delivers an eighth article a8 to the sixth stacking conveyor 36, a ninth article a9 to the fifth stacking conveyor 35, a tenth article a10 to the fourth stacking conveyor 34, and an eleventh article a11 to the third stacking conveyor 33.

Figure 17:
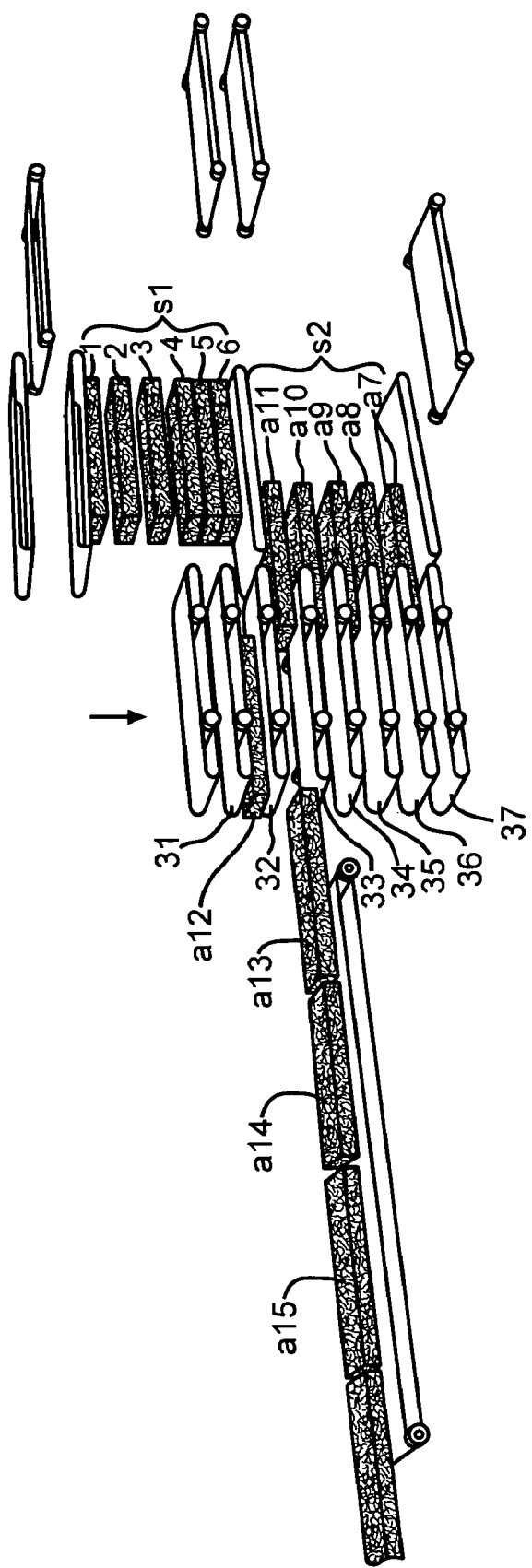

The third stacking conveyor 33 through seventh stacking conveyor 37 are operatively engaged, or activated, by stacking assembly 14 such that the seventh through eleventh compressible batts a7-a11 are conveyed to third pre-compressing conveyor 43 of the pre-compressing assembly 16, as shown in FIG. 17. The seventh through eleventh compressible batts a7-a11 form a second stack s2.

Figure 18:
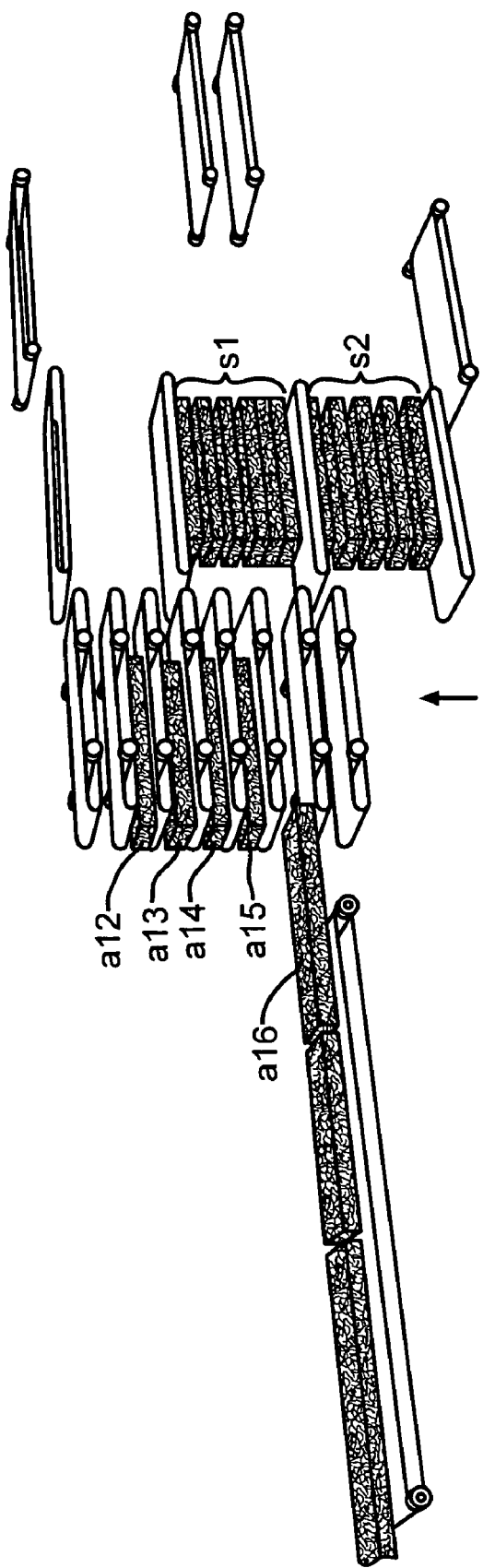

While the seventh through eleventh compressible batts a7-a11 are being formed into the second stack s2, the continuous distributive conveyor 22 is delivering additional compressible batts to the stacking assembly 14, as shown in FIG. 17. As the stacking assembly 14 continues to move in the upward direction, the continuous distributive conveyor 22 delivers a twelfth article a12 to the second stacking conveyor 32, a thirteenth article a13 to the third stacking conveyor 33, a fourteenth article a14 to the fourth stacking conveyor 34, a fifteenth article a15 to the fifth stacking conveyor 35, and a sixteenth article a16 to the sixth stacking conveyor 36, as shown in FIG. 18.

Figure 19:
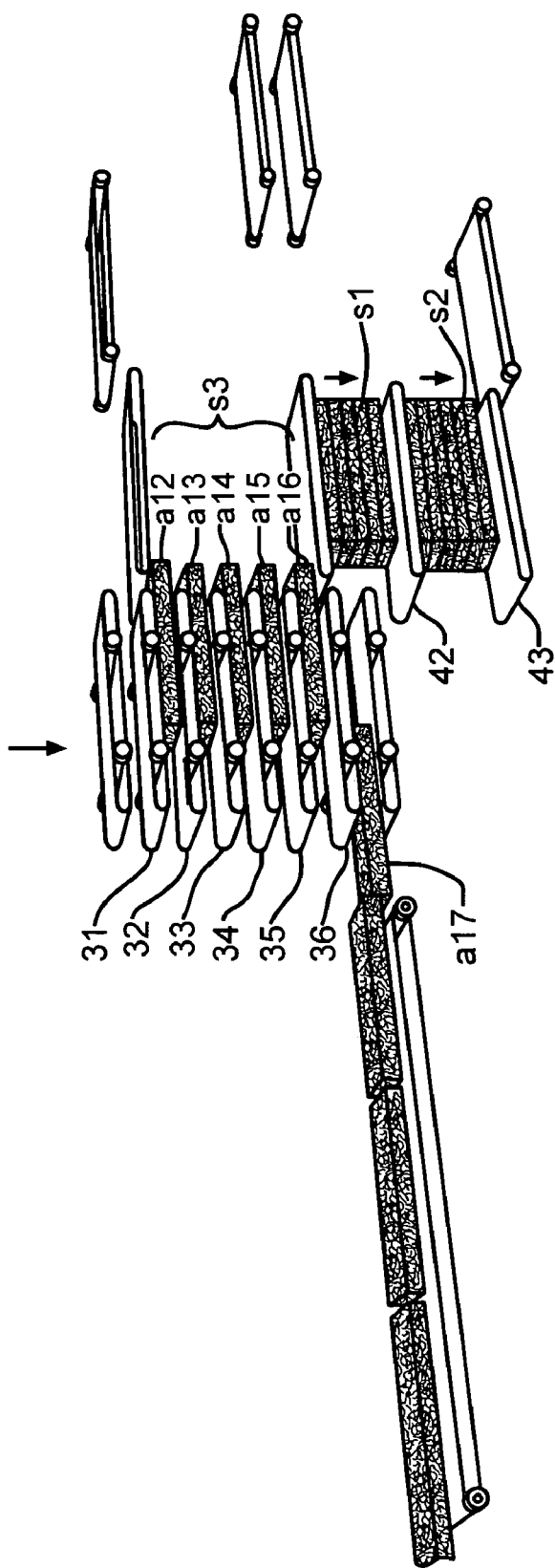

The compressible batts a12 through a16 are being delivered to the stacking assembly 14 to form a third stack s3, as shown in FIG. 19. At the same time, the first pre-compressing conveyor 41 and the second pre-compressing conveyor 42 are operatively moved by the pre-compressing assembly 16 in a downward direction, as shown in FIGS. 18 and 19 by an arrow C. The first pre-compressing conveyor 41 and the second pre-compressing conveyor 42 are moved in a downward direction toward the third pre-compressing conveyor 43 such that the stacks s1 and s2 are compressed, as shown in FIG. 19 by the arrows D and E, respectively.

While the stack s3 is being conveyed to the first pre-compressing conveyor 41, the continuous distributive conveyor 22 is delivering additional compressible batts to the stacking assembly 14. The continuous distributive conveyor 22 delivers a seventeenth article a17 to the seventh stacking conveyor 37, an eighteenth article a18 to the sixth stacking conveyor 36, and so on as the stacking assembly 14 again moves in the downward direction.

Figure 20:
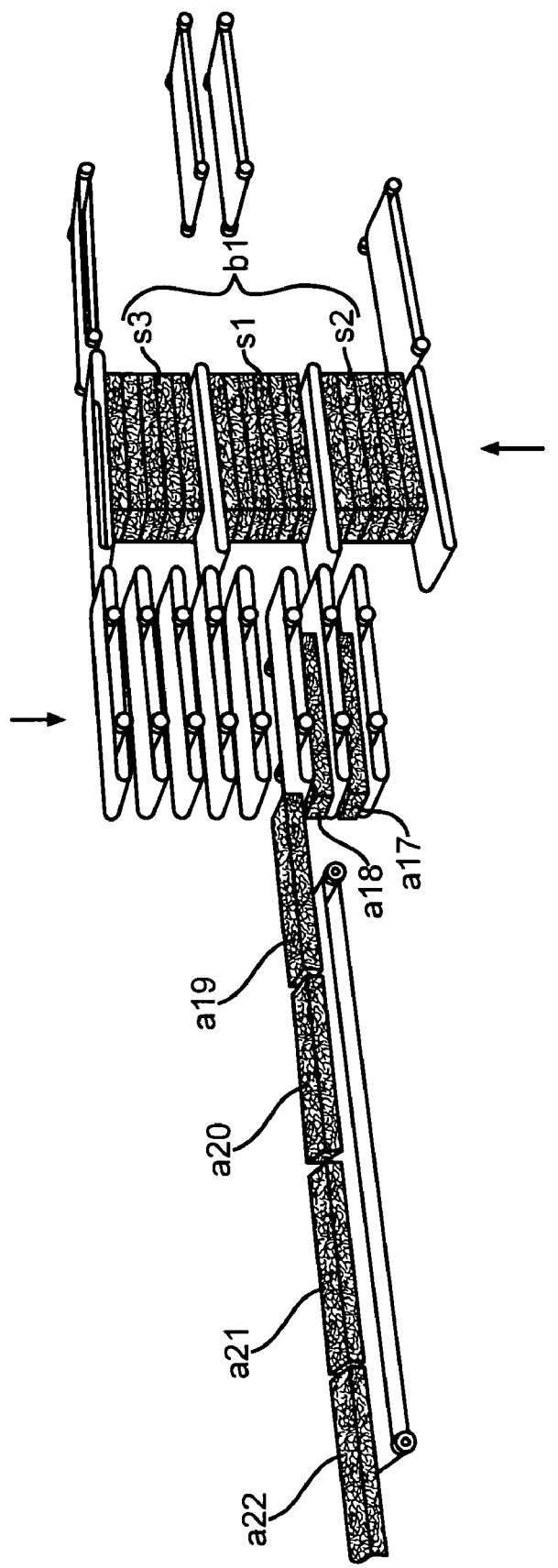
Figure 21:
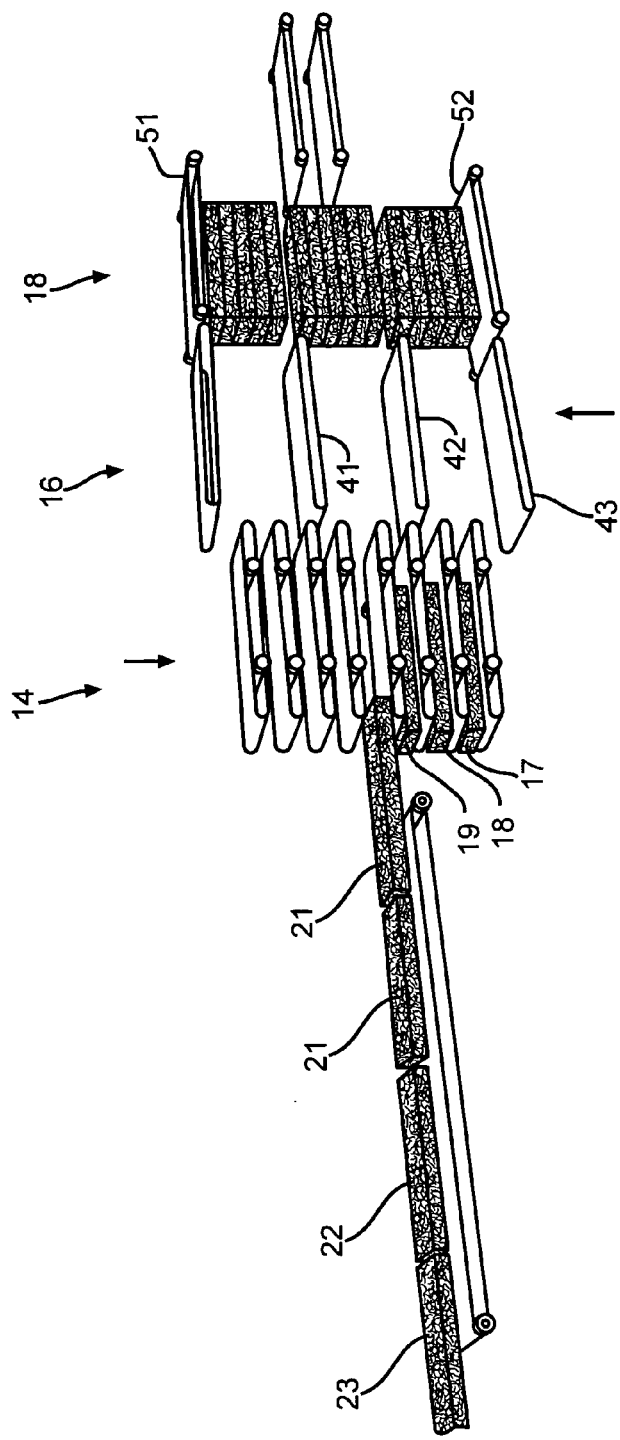

As the continuous distributive conveyor 22 continues to deliver compressible batts to the stacking assembly 14, the pre-compressing assembly 16 reverses direction and moves in an upward direction, as indicated by arrow F, toward the first pre-compressing conveyor 41, thereby compressing the third stack s3, as shown in FIG. 20. The first pre-compressing conveyor 41, the second pre-compressing conveyor 42 and the third pre-compressing conveyor 43 are operatively engaged, or activated by, the pre-compressing assembly 16 to convey the compressed stacks s1-s3 to the compressing assembly 18, as shown in FIGS. 20 and 21.

Figure 22:
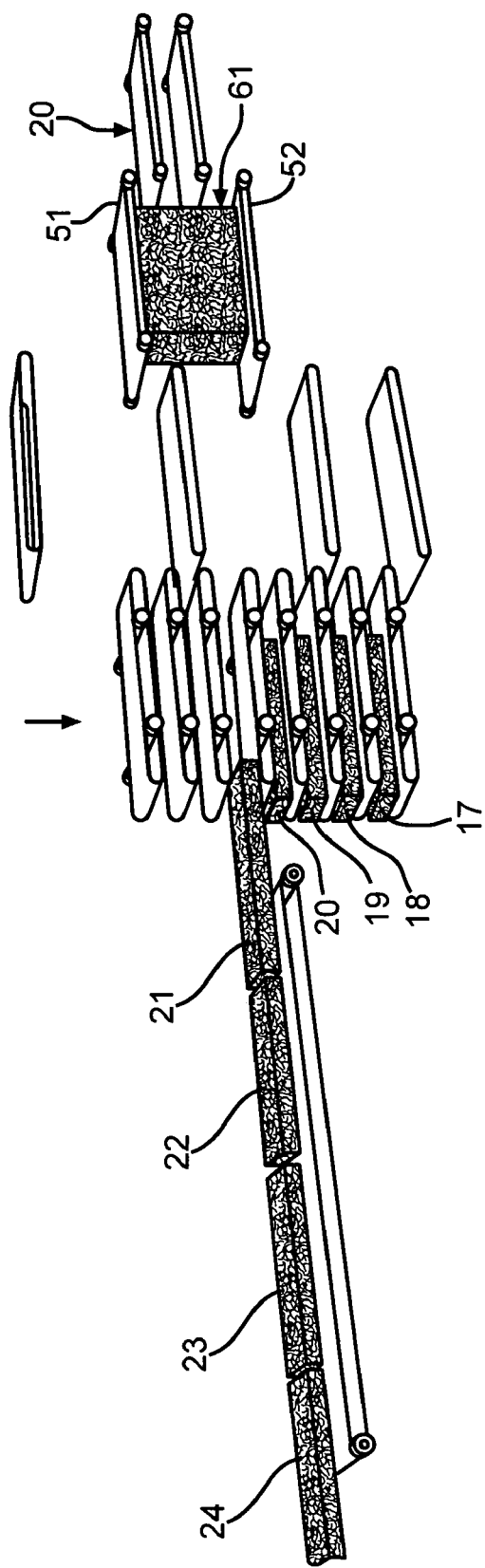

The compressing assembly 18 includes a top compressing conveyor 51 and a bottom compressing conveyor 52. The top compressing conveyor 51 and the bottom compressing conveyor 52 are in an opposed and parallel relationship with respect to each other. The bottom compressing conveyor 52 is in a coplanar relationship with third pre-compressing conveyor 43 such that the stacks s1, s2 and s3 are delivered to the bottom compressing conveyor 52. After the stacks s1-s3 are conveyed to the bottom compressing conveyor 52, the top compressing conveyor 51 and the bottom compressing conveyor 52 are moved in a direction toward each other, as shown in FIG. 22. The top compressing conveyor 51 and the bottom compressing conveyor 52 compress the stacks s1-s3 to form a first batch b1.

Figure 23:
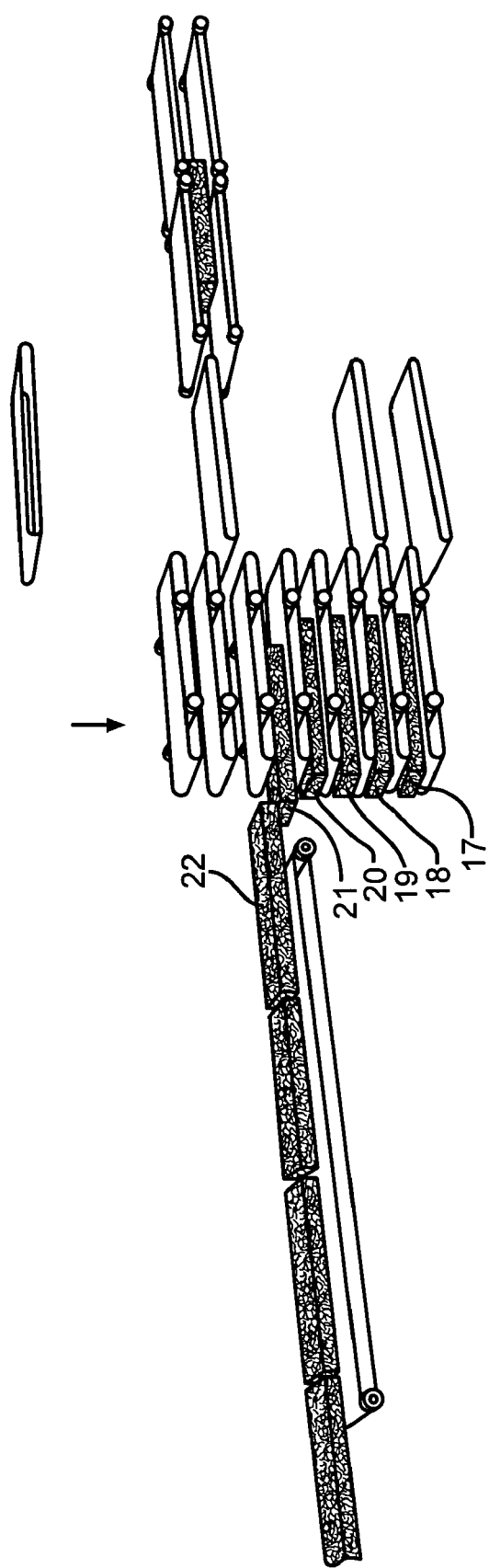

The top compressing conveyor 51 and bottom compressing conveyor 52 are operatively engaged, or activated by, the compressing assembly 18 to convey the batch b1 to the packaging assembly 20, as shown in FIG. 23. The packaging assembly 20 includes a top packaging conveyor 61 and a bottom packaging conveyor 62. The top packaging conveyor 61 and the bottom packaging conveyor 62 are in an opposed and parallel relationship.

Figure 24:
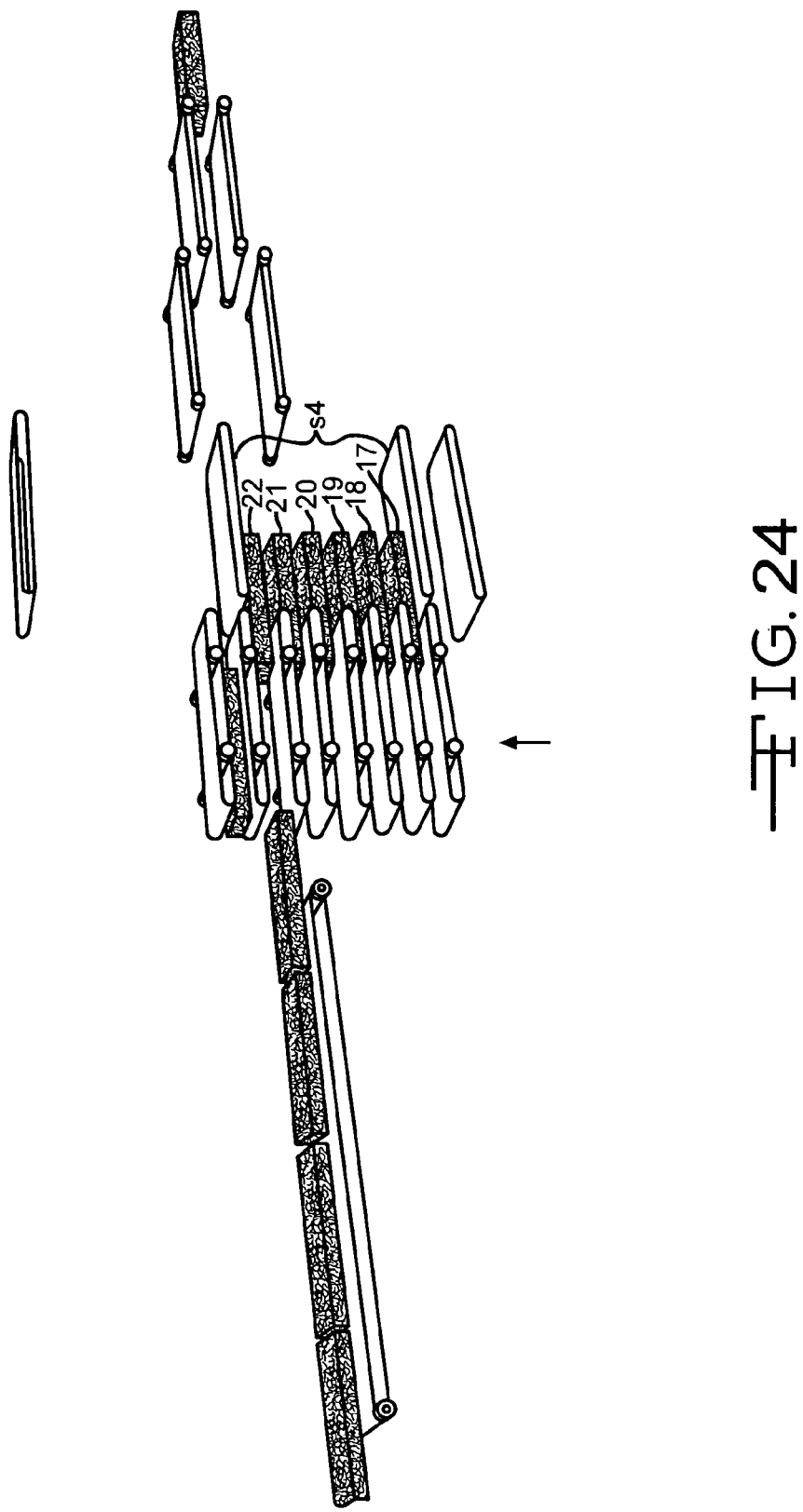
Figure 25:
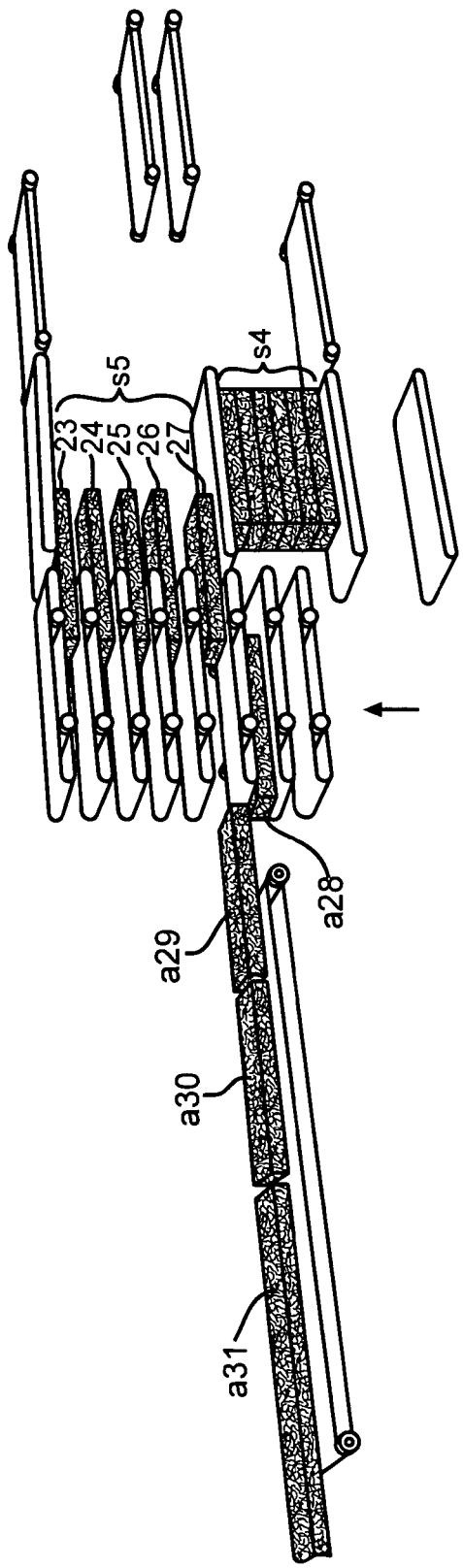

Referring again to FIGS. 19 to 23, the continuous distributive conveyor 22 is delivering the compressible batts a17 through a22 to the stacking assembly 14 to form a fourth stack s4. As shown in the figures, the stacking assembly 14 is movable in a downward direction to receive the compressible batts a17-a22. As shown in FIG. 24, the stack s4 is delivered to the second pre-compressing conveyor 42 of the stacking assembly 14. The continuous distributive conveyor 22 continues to deliver yet additional compressible batts, such as shown in FIG. 24 where an article a23 is delivered to the first stacking conveyor 31, and so on. In this second half of the multi-reciprocating cycle, the stacking assembly 14 is again moved in the upward direction, as shown by arrow A. FIG. 25 shows compressible batts a23 through a27 being conveyed to the first pre-compressing conveyor 41 of the stacking assembly 14, thereby forming a fifth stack s5.

The stacking assembly 14 continues to move in the upward direction while the sixth stacking conveyor 36 receives an article a28, as shown by arrow A in FIG. 25. The stacking assembly 14 is engaged such that the stack s5 is moved to first pre-compressing conveyor 41, as shown in FIG. 26.

Figure 26:
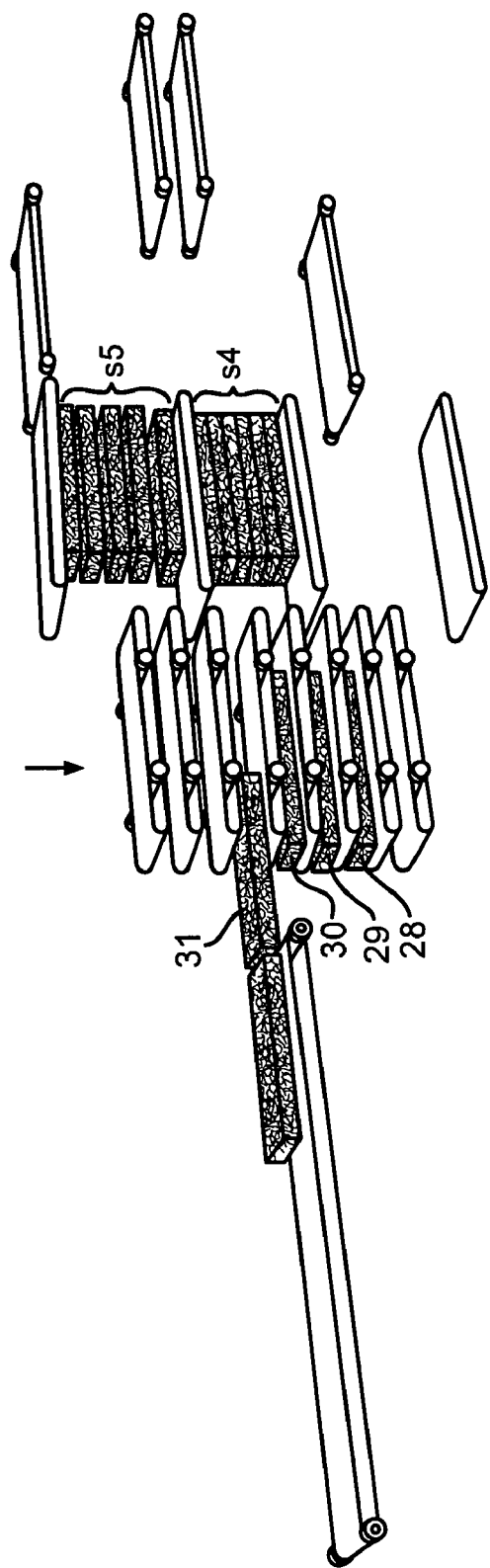
Figure 27:
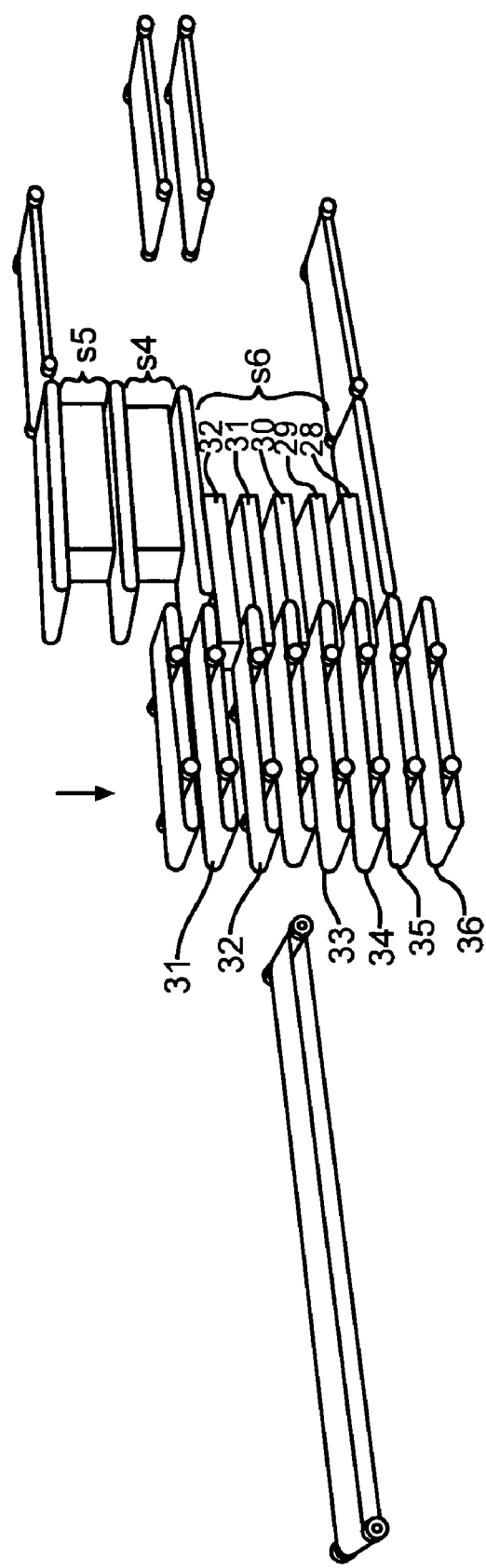

The stacking assembly 14 is moved in the downward direction, as shown by arrow B, and the stacking assembly 14 continues to receive compressible batts a28 through a32, as shown in FIGS. 26 and 27.

The second stacking conveyor 32 through the sixth stacking conveyor 36 are operatively engaged by the stacking assembly 14 are moved by stacking assembly 14 to the pre-compressing assembly pre-compressing assembly 16 to form a sixth stack s6. The first pre-compressing conveyor 41 and the second pre-compressing conveyor 42 are moved in the upward direction toward the top engaging pre-compressing conveyor 40t while the pre-compressing assembly 16 is delivering the sixth stack s6 to the third pre-compressing conveyor third pre-compressing conveyor 43, and the first pre-compressing conveyor 41 and second pre-compressing conveyor 42 are moved in a vertical direction toward the third pre-compressing conveyor 43.

Figure 28:
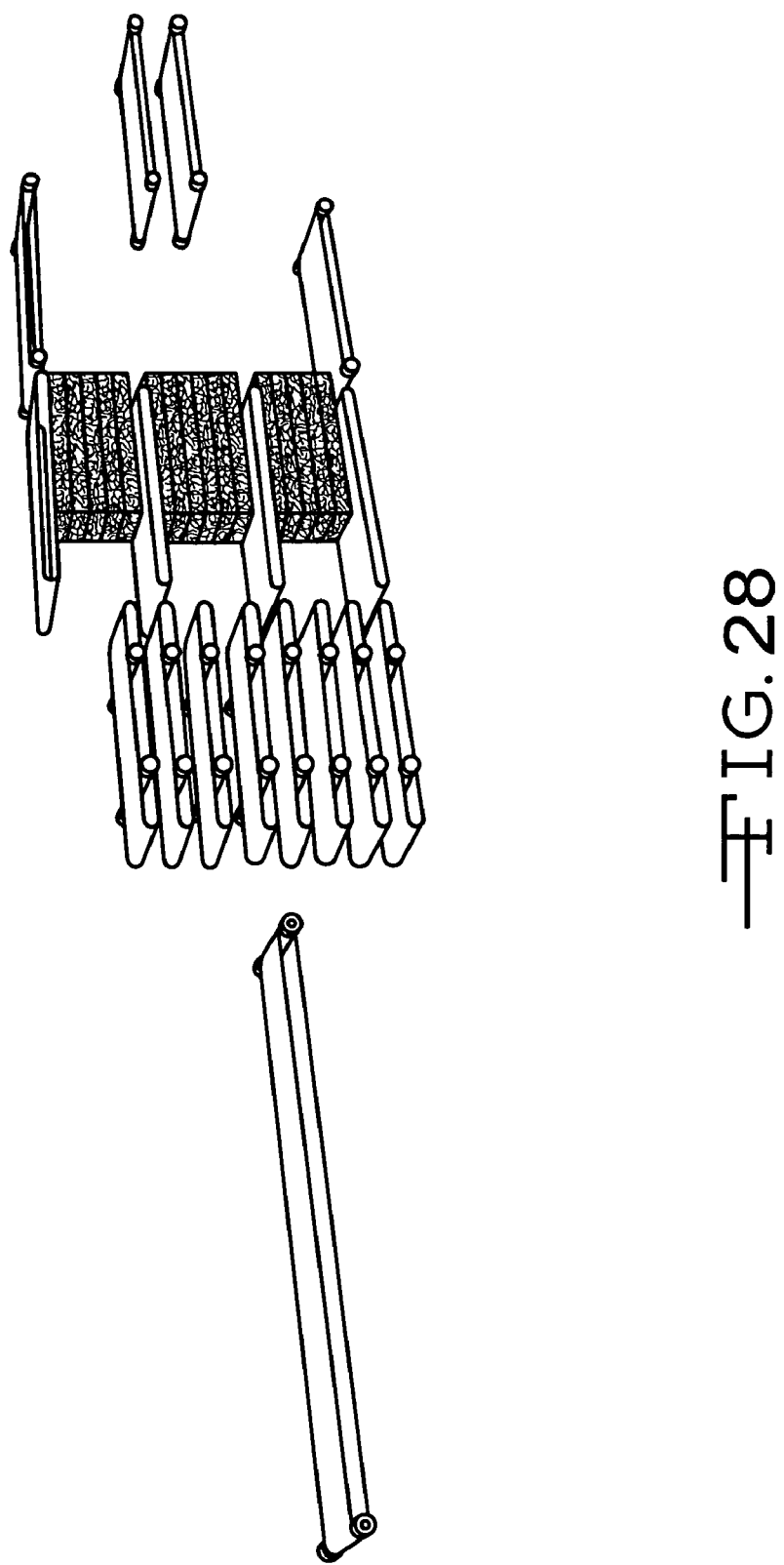

The pre-compressing assembly 16 activates the top pre-compressing conveyor 40t, the first pre-compressing conveyor 41, the second pre-compressing conveyor 42, and the third pre-compressing conveyor 43 to convey the stacks s4-s6 to the compressing assembly 18, as shown in FIGS. 28 and 29.

Figure 30:
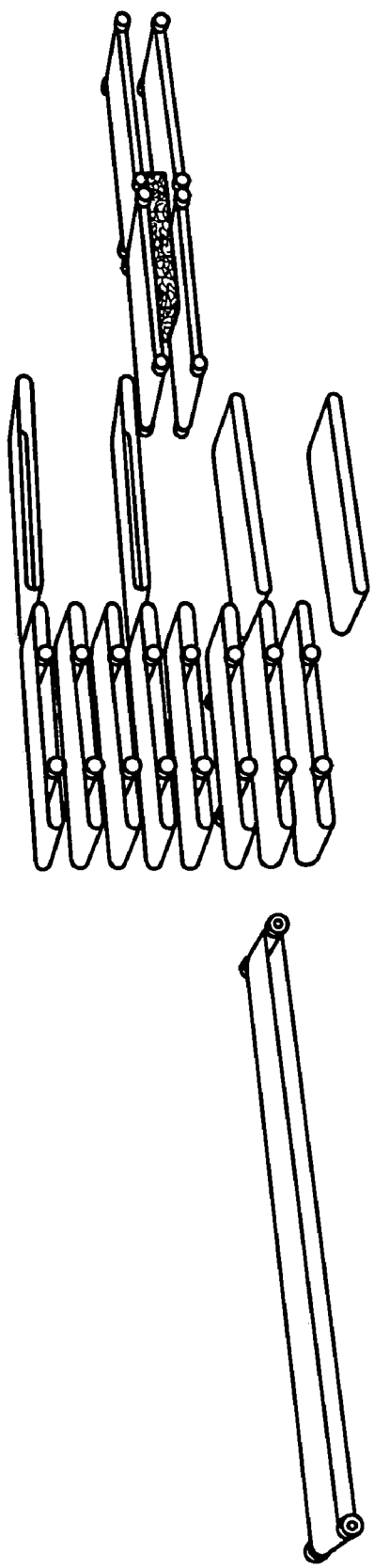

The top compressing conveyor 51 and the bottom compressing conveyor 52 are moved in a direction toward each other such that a second batch b2 is formed. The batch b2 contains the compressed stacks s4-s6, as shown in FIGS. 29 and 30.

The top compressing conveyor 51 and the bottom compressing conveyor 52 of the compressing assembly 18 are moved in a direction toward each other and compress the multiple, pre-compressed stacks s4, s5 and s6 into a batch b2. The compressing assembly 18 delivers the compressed batch b2 to the packaging assembly 20 for packaging and/or covering the compressed batches b2.

The principles and the modes of operation of this invention have been described in its preferred embodiments. However, it should be noted that this invention may be practiced otherwise than as specifically illustrated and described without departing from the scope of the invention.

I claim:

1. A conveyor assembly configured to convey and maintain compression of multiple compressible batts, the assembly comprising a vertical stack of at least two conveyor systems, wherein adjacent pairs of conveyor systems within the conveyor assembly define a space between the pair of conveyor systems for receiving and conveying compressible batts; and a pair of adjacent conveyor systems has:

i) at least two upper belts in a coplanar relationship and positioned above and facing the space between the pair of conveyor systems, with one of the two upper belts positioned above the space mounted for traveling in an advancing direction relative to the conveyor assembly and the other of the two upper belts positioned above the space mounted for traveling in a returning direction; and, ii) and at least two lower belts in a coplanar relationship and positioned below and facing the space between the pair of conveyor systems, with one of the two lower belts positioned below the space mounted for traveling in the advancing direction relative to the conveyor assembly and the other of the two lower belts positioned below the space mounted for traveling in the returning direction.

2. The assembly of claim 1 including shields associated with each of the belts traveling the returning direction, the shields being positioned to prevent contact between the belts and a compressible batt contained between the conveyor systems.

3. The assembly of claim 1, wherein the upper advancing belt and the lower returning belt are in a vertically aligned relationship, and wherein the lower advancing belt and the upper returning belt are in a vertically aligned relationship.

4. The conveyor assembly of claim 1, wherein each belt operatively engages and extends between a forward driving roller assembly configured to drive one belt in the advancing direction and a rearward driving roller assembly configured to drive an adjacent belt in the returning direction.

5. The conveyor assembly of claim 4, wherein the forward driving roller assembly includes an axis having mounted thereon: i): a drive roller configured to drive the advancing belt, and ii) an idler roller configured to allow the returning belt to freely rotate about the forward drive roller axis; and
wherein the rearward driving roller assembly includes an axis having mounted thereon: i) a rearward drive roller configured to drive the returning belt, and ii) an idler roller configured to allow the advancing belt to freely rotate about the rearward driving roller axis.

6. The conveyor assembly of claim 1, including a controlling device configured to allow each conveyor system to be separately controlled.

7. The conveyor assembly of claim 4, including a controlling device configured to allow each forward driving assembly and each rearward driving assembly to be separately controlled.

8. The assembly of claim 1 wherein a pair of adjacent conveyor systems has:
i) four upper belts in a coplanar relationship and positioned above and facing the space between the pair of conveyor systems, with two of the four upper belts positioned above the space mounted for traveling in the advancing direction and the other of the four upper belts positioned above the space mounted for traveling in the returning direction; and,
ii) four lower belts in a coplanar relationship and positioned below and facing the space between the pair of conveyor systems, with two of the four lower belts positioned below the space mounted for traveling in the advancing direction and the other of the four lower belts positioned below the space mounted for traveling in the returning direction.

9. The assembly of claim 8 including shields associated with each of the belts traveling the returning direction, the shields being positioned to prevent contact between the belts and a compressible batt contained between the conveyor systems.

10. The assembly of claim 8, wherein the upper advancing belts and the lower returning belts are in a vertically aligned relationship, and wherein the lower advancing belts and the upper returning belts are in a vertically aligned relationship.

11. The conveyor assembly of claim 8, wherein each belt operatively engages and extends between a forward driving roller assembly configured to drive the advancing belt in the advancing direction and a rearward driving roller assembly configured to drive the returning belt in the returning direction.

12. The conveyor assembly of claim 11, wherein the forward driving roller assembly includes an axis having mounted thereon: i) forward drive rollers configured to drive the advancing belts, and ii) idler rollers configured to allow the returning belts to freely rotate about the forward drive roller axis; and
wherein the rearward driving roller assembly includes an axis having mounted thereon: i) rearward drive rollers configured to drive the returning belts, and ii) idler rollers configured to allow the advancing belts to be freely rotate about the rearward driving roller axis.

13. The conveyor assembly of claim 8, wherein the four upper belts are in a coplanar relationship and a first and third belt are the advancing belts and the second and fourth belts are the returning belts; and wherein the four lower belts are in a coplanar relationship and a first and third belt are the returning belts and the second and fourth belts are the advancing belts.

14. The conveyor assembly of claim 8, wherein the four upper belts are in a coplanar relationship and a first and fourth belt are the advancing belts and the second and third belts are the returning belts; and wherein the four lower belts are in a coplanar relationship and a first and fourth belt are the returning belts and the second and third belts are the advancing belts.

15. The conveyor assembly of claim 8, including a controlling device configured to allow each conveyor system to be separately controlled.

16. The conveyor assembly of claim 8, including a controlling device configured to allow each forward driving assembly and each rearward driving assembly to be separately controlled.

17. A method for conveying compressible batts and for maintaining compression of multiple compressible batts, comprising:
conveying multiple compressible batts using a conveyor assembly configured to convey and maintain compression of multiple compressible batts, the assembly comprising a vertical stack of at least two conveyor systems, wherein adjacent pairs of conveyor systems within the conveyor assembly define a space between the pair of conveyor systems for receiving and conveying compressible batts; and,
a pair of adjacent conveyor systems has:
i) at least two belts in a coplanar relationship and positioned above and facing the space between the pair of conveyor systems, with one of the two belts positioned above the space mounted for traveling in an advancing direction relative to the conveyor assembly and the other of the two belts positioned above the space mounted for traveling in a returning direction, and
ii) and at least two belts in a coplanar relationship and positioned below and facing the space between the pair of conveyor systems, with one of the two belts positioned below the space mounted for traveling in the advancing direction relative to the conveyor assembly and the other of the two belts positioned below the space mounted for traveling in the returning direction.

18. The method of claim 17, including separately controlling each conveyor system.

19. The method of claim 17, including separately controlling each forward driving assembly and each rearward driving assembly.

20. The method of claim 17, wherein the upper advancing belt and the lower returning belt are in a vertically aligned relationship, and wherein the lower advancing belt and the upper returning belt are in a vertically aligned relationship.

21. The method of claim 17, wherein the conveyor assembly includes:
   i) four upper belts in a coplanar relationship and positioned above and facing the space between the pair of conveyor systems, with two of the four upper belts positioned above the space mounted for traveling in the advancing direction and the other of the four upper belts positioned above the space mounted for traveling in the returning direction; and,
   ii) four lower belts in a coplanar relationship and positioned below and facing the space between the pair of conveyor systems, with two of the four lower belts positioned below the space mounted for traveling in the advancing direction and the other of the four lower belts positioned below the space mounted for traveling in the returning direction.

22. The method of claim 21, wherein the upper advancing belts and the lower returning belts are in a vertically aligned relationship, and wherein the lower advancing belts and the upper returning belts are in a vertically aligned relationship.

23. The method of claim 21, further including: advancing the first and third upper belts in the advancing direction; and returning the second and fourth lower belts in the returning direction.

24. The method of claim 21, further including: advancing the second and third upper belts in the advancing direction; and returning the first and fourth lower belts in the returning direction.

25. The method of claim 17, including sequentially receiving individual batts, and substantially simultaneously transferring a plurality of batts.

26. The method of claim 17, including:
   sequentially receiving individual batts in each space between the pair of conveyor systems;
   holding each individual batt in each space until a determined number of batts are held in the conveyor assembly; and,
   transferring the held batts as a stack of batts from the conveyor assembly.

27. The method of claim 26, further including simultaneously receiving at least one further batt while the stack of batts is being transferred from the conveyor assembly.

* * * * *